(12) United States Patent
Kawai et al.

(10) Patent No.: US 7,098,556 B2
(45) Date of Patent: Aug. 29, 2006

(54) CONTROL SYSTEM OF REGENERATION SYSTEM AND CONTROL METHOD THEREOF

(75) Inventors: Takashi Kawai, Susono (JP); Hiroshi Tsujii, Mishima (JP); Ken Kuretake, Mishima (JP); Masanori Sugiura, Toyota (JP); Hideto Hanada, Yokohama (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 426 days.

(21) Appl. No.: 10/391,599

(22) Filed: Mar. 20, 2003

(65) Prior Publication Data

US 2004/0070372 A1    Apr. 15, 2004

(30) Foreign Application Priority Data

Apr. 9, 2002    (JP) .............................. 2002-107071

(51) Int. Cl.
    *H02J 7/34* (2006.01)
(52) U.S. Cl. ...................................... 307/46
(58) Field of Classification Search ............... 307/46
    See application file for complete search history.

(56) References Cited

U.S. PATENT DOCUMENTS

| | | | |
|---|---|---|---|
| 5,323,102 A * | 6/1994 | Torii et al. ................ 322/90 |
| 6,384,489 B1 | 5/2002 | Bluemel et al. ............ 307/10.1 |
| 6,777,909 B1 | 8/2004 | Aberle et al. .............. 320/104 |
| 2002/0109407 A1 * | 8/2002 | Morimoto et al. ......... 307/10.1 |
| 2003/0168266 A1 * | 9/2003 | Sasaki et al. .............. 180/65.3 |

FOREIGN PATENT DOCUMENTS

| | | |
|---|---|---|
| DE | 198 46 319 C1 | 2/2000 |
| DE | 199 54 306 A1 | 7/2001 |
| DE | 100 42 524 A1 | 3/2002 |
| JP | A 2000-59903 | 2/2000 |

* cited by examiner

*Primary Examiner*—Brian Sircus
*Assistant Examiner*—Hal I. Kaplan
(74) *Attorney, Agent, or Firm*—Oliff & Berridge, PLC

(57) ABSTRACT

In a control system of a regeneration system, electric power generated by a first electric generator is supplied to a first electric power storing device, and electric power is transmitted, via an intermediary device, between the first electric power storing device and a second electric power storing device which is provided separately from the first electric power storing device. The control system of a regeneration system includes determination means for determining whether or not an electric power generation amount of the first electric generator is equal to or larger than a predetermined amount, and electric power storing performance control means for determining whether or not the electric power of the second electric power storing device is to be supplied to the first electric power storing device via the intermediary device based on a determination result of the determination means.

18 Claims, 6 Drawing Sheets

CONTROL SYSTEM OF REGENERATION SYSTEM AND CONTROL METHOD THEREOF

INCORPORATION BY REFERENCE

The disclosure of Japanese Patent Application No. 2002-107071 filed on Apr. 9, 2002 including the specification, drawings and abstract is incorporated herein by reference in its entirety.

BACKGROUND OF THE INVENTION

1. Field of the Invention

The invention relates to a control system of a regeneration system which supplies electric power generated by an electric generator to an electric power storing device, and a control method thereof.

2. Description of the Related Art

There is a vehicle in which an electric motor is driven by electric power of an electric power storing device, and torque of the electric motor is transmitted to a wheel so as to generate a driving force. In such a vehicle, a control is performed such that kinetic energy of the wheel is transmitted to the electric motor, the electric motor functions as an electric generator, and generated electric power is stored in the electric power storing device during coasting. An example thereof is disclosed in Japanese Patent Laid-Open Publication No. 2000-59903. A regenerative energy charging device disclosed in this patent publication includes an electric generator which is connected to a wheel so that power can be transmitted, plural capacitors (or secondary batteries) which are electrically connected to the electric generator, and a connection switching device which switches connection states of the plural capacitors.

The kinetic energy of the wheel is transmitted to the electric generator so that regenerative braking is performed during deceleration of the vehicle, and the plural capacitors are charged with the regenerative energy. Also, when generated voltage and the voltage of the plural capacitors are compared and the generated voltage is lower than the voltage of the capacitors, the connection of the plural capacitors is switched from series connection to parallel connection, thereby improving the regeneration ratio.

However, in the regenerative energy charging device disclosed in the aforementioned patent publication, the connection switching device needs to be provided in addition to existing components, which increases the number of the components of the charging device. As a result, the production efficiency decreases, the manufacturing cost increases, and the size and the weight of the device increases.

SUMMARY OF THE INVENTION

The invention is made in order to solve the aforementioned problems, and it is an object of the invention to provide a control system of a regeneration system, which can increase the recovery amount of electric power without increasing the number of components of the device, and a control method thereof.

In order to achieve the aforementioned object, a control system of a regeneration system according to a first aspect of the invention is configured such that electric power generated by a first electric generator is supplied to a first electric power storing device, and the electric power is transmitted, via an intermediary device, between the first electric power storing device and a second electric power storing device which is provided separately from the first electric power storing device. The control system of a regeneration system includes determination means or a determination portion which determines whether or not an electric power generation amount of the first electric generator is equal to or larger than a predetermined amount, and control means or a control device which determines whether or not the electric power of the second electric power storing device is to be supplied to the first electric power storing device via the intermediary device, based on the determination result of the determination means or the determination portion.

According to the first aspect, when the electric power generation amount of the first electric generator is equal to or larger than the predetermined amount, the electric power of the second electric power storing device is supplied to the first electric power storing device via the intermediary device. In this case, if the first electric power storing device has a characteristic that the electric power storing performance is improved (the capacitance increases) with an increase in the voltage, the electric power generation amount of the first electric generator increases. Also, since the intermediary device is a component which is previously provided so as to allow the electric power to be transmitted between the first electric power storing device and the second electric power storing device, there is no need to newly provide another component in addition to the existing device.

Further, the configuration may be such that the second electric power storing device is a secondary battery, a second electric generator is provided separately from the first electric generator, and the electric power generated by the second electric generator is supplied to the second electric power storing device.

According to this aspect, the second electric power storing device is a secondary battery, the electric power is supplied from the second electric power storing device to the first electric power storing device, and the voltage of the second electric power storing device decreases. If the second electric power storing device has a characteristic that electric power storing performance is improved (the charging resistance decreases) with a decrease in the voltage, the efficiency in storing the electric power from the second electric generator in the second electric power storing device is improved.

A control system of a regeneration system according to a second aspect of the invention is configured such that electric power of a first electric generator is stored in a first electric power storing device, and electric power of a second electric generator is stored in a second electric power storing device. The control system of a regeneration system includes determination means or a determination portion which determines whether or not the electric power generation amount of the first electric generator is equal to or larger than a predetermined amount, and control means or control device which determines whether or not the electric power of the first electric generator is to be supplied to the second electric power storing device so as to increase the electric power generation amount of the first electric generator based on the determination result of the determination means or the determination portion.

According to the second aspect, it is determined whether or not the electric power generation amount of the first electric generator is equal to or larger than the predetermined amount. On the basis of the determination result, it is determined whether or not the electric power of the first electric generator is to be supplied to the second electric power storing device so as to increase the electric power generation amount of the first electric generator. Since the second electric power storing device is a component which is previously provided, there is no need to newly provide another component.

DETAILED DESCRIPTION OF THE PREFERRED EMBODIMENTS

Figure 2:
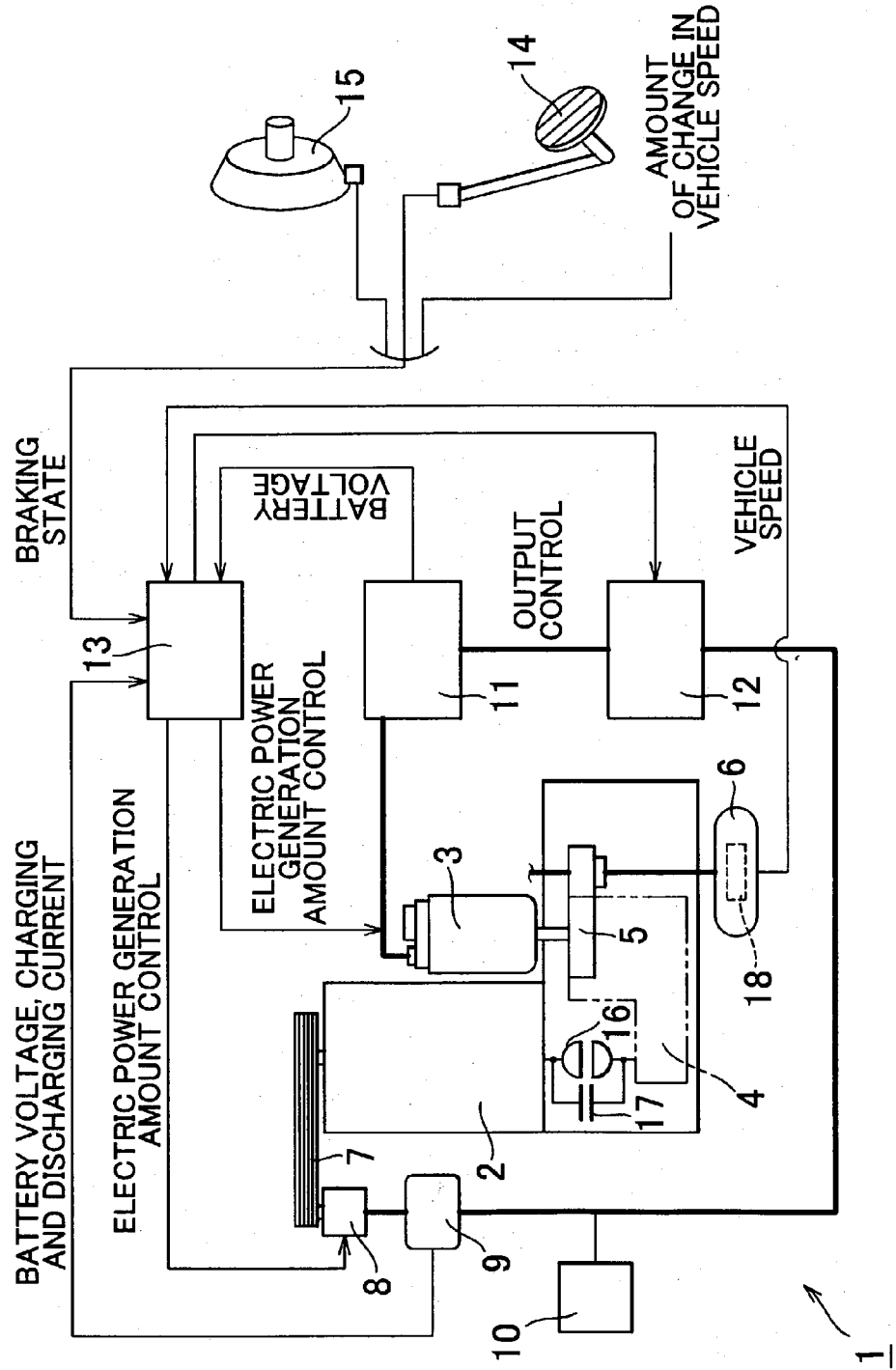
FIG. 2 is a conceptual diagram showing an example of a configuration of a vehicle to which the first embodiment can be applied.

A first embodiment of the invention will be described. FIG. 2 is a conceptual diagram showing the configuration of a power train, an electric system, and a control system of a vehicle 1 to which the invention is applied. First, the configuration of the power train of the vehicle 1 will be described. The vehicle 1 includes an engine 2 as a driving power source, and a motor-generator (a regenerative generator) 3. As the engine 2, an internal combustion engine such as a gasoline engine, a diesel engine, or an LPG engine can be employed. A transmission 4 is provided on the output side of the engine 2, and a rotating member 5 of the transmission 4 and a wheel 6 are connected so that power can be transmitted.

Also, the motor-generator 3 and the rotating member 5 are connected so that power can be transmitted. The motor-generator 3 has a powering function which transforms electric energy to kinetic energy, and a regeneration function which transforms kinetic energy to electric energy. As the motor-generator 3, for example, a three phase alternating current type motor-generator can be employed. Further, a fluid transmission device 16 and a lock-up clutch 17 are disposed in parallel in a power transmission path between the engine 2 and the transmission 4. Note that an actuator (not shown) which controls the engagement pressure of the lock-up clutch 17 is provided. Further, a friction brake 18 is provided in the wheel 6. The friction brake 18 performs braking for the wheel 6 based on the stroke amount of a brake pedal 14 and the like. As the friction brake 18, a disc brake or a drum brake can be employed. Also, an actuator (not shown) which controls the braking power of the friction brake 18 based on the stroke amount of the brake pedal 14 and other conditions discussed below is provided.

Next, the electric system of the vehicle 1 will be described. An alternator 8 is connected to a crankshaft (not shown) of the engine 2 via a transmission device 7. A battery (for example, a lead battery) 9 is connected to the alternator 8, and a circuit which supplies the electric power of the battery 9 to a 12V-load 10 is formed. The battery 9 is a system which transforms electric energy to chemical energy and storing the chemical energy.

Also, a capacitor (a condenser) 11, which is an electric power storing device other than the battery 9, is provided. The capacitor 11 can be charged with the electric power generated by the motor-generator 3. The capacitor 11 is configured such that an insulator is interposed between conductive members (metal plates). Electric charge is stored in each of the conductive members. The voltage of the battery 9 is 12V, and the voltage of the capacitor is 36V. Thus, the battery 9 and the capacitor 11 are different in characteristics such as a principle of storing electric power, and a property of accepting electric power. Further, a circuit which connects the capacitor 11, the battery 9, and the 12V-load 10 is formed. In the circuit, a DC/DC converter (a transformer) 12 is disposed between the battery 9 and the capacitor 11.

Further, the control system which controls the entire vehicle 1 will be described. An electronic control unit (ECU) 13 is provided, and the ECU 13 determines an acceleration request and a braking state, a vehicle speed, the rotational speed of the motor-generator 3, the voltage and charging/discharging current of the battery 9, the voltage of the capacitor 11 and the like. The braking state includes a braking request of a driver, an actual braking force applied to the vehicle 1, and the like. This braking state is determined based on the stroke amount of the brake pedal 14, the hydraulic pressure of a brake master cylinder 15, the amount of change in the vehicle speed, and the like. Meanwhile, the ECU 13 outputs signals which control the electric power generation amount of the motor-generator 3, the electric power generation amount of the alternator 8, the operation of the DC/DC converter 12, the actuator for the friction brake 18, the actuator for the lock-up clutch 17, and the like.

Next, the control of the vehicle 1 will be described. When the engine 2 is driven, the engine torque is transmitted to the wheel 6 via the transmission 4, and the driving force is generated. At this time, the ECU 13 controls the injection amount of fuel to be supplied to the engine 2, injection timing, and the like, and adjusts the engine output. Also, when the electric power of the capacitor 11 is supplied to the motor-generator 3 and the motor-generator 3 is driven as the electric motor, the torque of the motor-generator 3 is transmitted to the wheel 6. Thus, the vehicle 1 is a so called hybrid vehicle which can use at least one of the engine 2 and the motor-generator 3 as the driving power source. It is also possible to make the motor-generator 3 function as the electric generator by supplying part of the engine torque to the motor-generator 3 and using the torque.

Further, while the vehicle 1 is coasting, it is possible to make the motor-generator 3 function as the electric generator by transmitting the kinetic energy of the wheel 6 to the motor-generator 3. Thus, when the motor-generator 3 is made to function as the electric generator using the kinetic energy of the wheel 6, a braking force corresponding to the electric power generation amount, that is, a regenerative braking force is applied to the vehicle 1.

Furthermore, while the vehicle 1 is coasting, the kinetic energy of the wheel 6 is transmitted to the engine 2 via the transmission 4, a braking force due to the rotational resistance of the engine 2, that is, a so called engine braking force is applied to the vehicle 1. Also, when the engine rotational speed is equal to or higher than a predetermined rotational speed while the vehicle 1 is coasting, a control stops fuel supply to the engine 2, that is, fuel cut control can be performed. Note that, when the engine rotational speed becomes lower than the predetermined rotational speed while the fuel cut control is performed, the fuel supply to the engine 2 is restarted.

A map for controlling the torque capacity of the lock-up clutch 17 is stored in the aforementioned ECU 13. The engagement pressure of the lock-up clutch 17 is controlled based on parameters specified in the map, such as vehicle speed and the opening of an accelerator. Thus, the lock-up clutch 17 is engaged, slipped, or disengaged. When the lock-up clutch 17 is engaged, power is transmitted between the engine 2 and the transmission 4 by the friction force. When the lock-up clutch 17 is disengaged, power is transmitted by the kinetic energy of fluid.

When the lock-up clutch 17 is engaged, the alternator 8 can generate electric power using the kinetic energy of the wheel 6. The electric power generation amount of the alternator 8 can be controlled based on electric power required by the 12V-load 10, and the other condition.

Also, when the electric power of the battery 9 which supplies the electric power to the 12V-load 10 decreases, the electric power of the capacitor 11 can be supplied to the battery 9 after the voltage of the capacitor 11 is decreased using the DC/DC converter 12. Also, when the electric power of the capacitor 11 which drives the motor-generator 3 functioning as the electric generator decreases, the electric power of the battery 9 can be supplied to the capacitor 11 after the voltage of the battery 9 is increased using the DC/DC converter 12.

Figure 1:
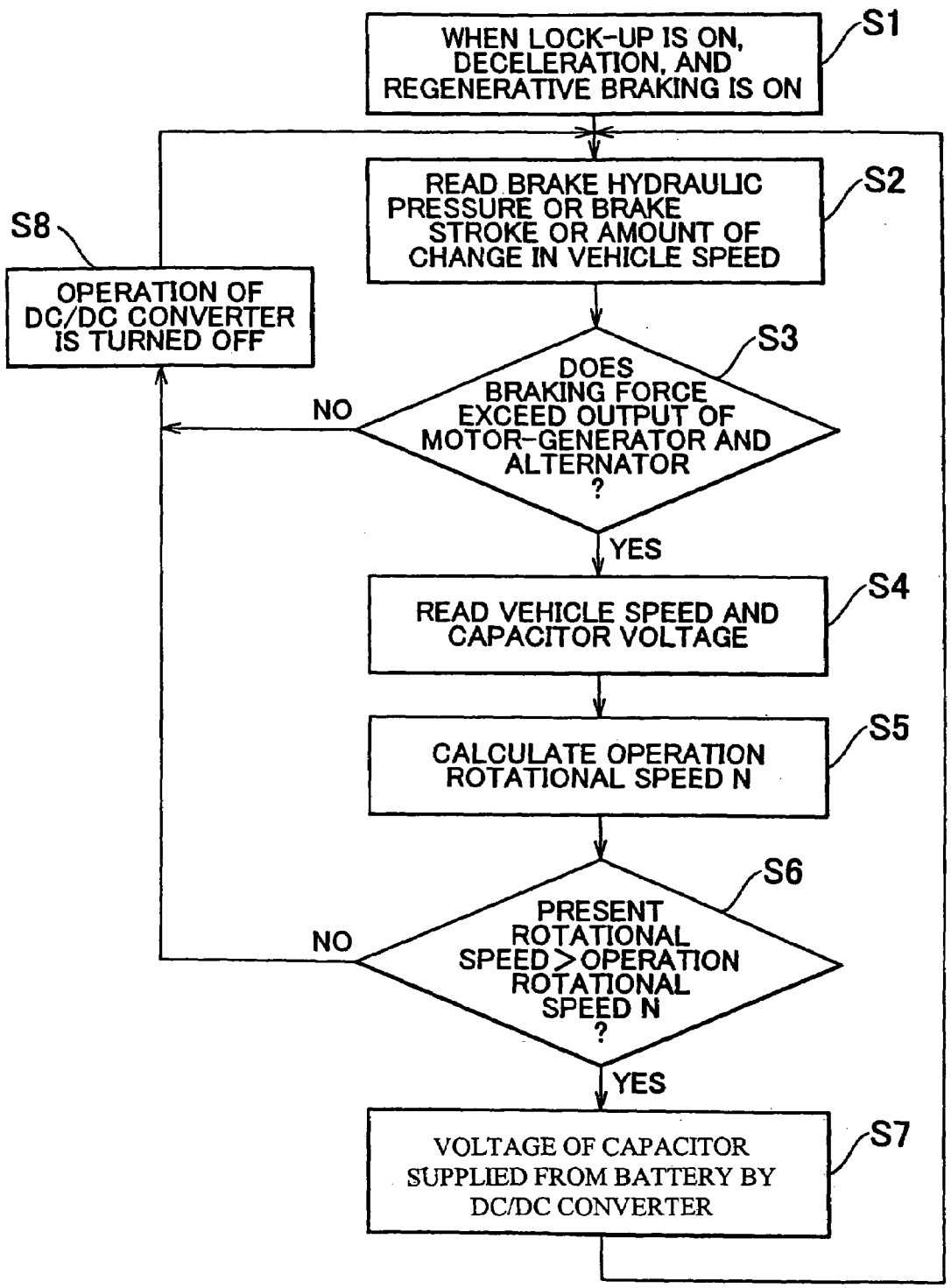
FIG. 1 is a flowchart showing a first embodiment of the invention.

Next, an example of control performed while the vehicle 1 decelerates will be described with reference to a flowchart in FIG. 1. When there is no acceleration request and the vehicle 1 is in a decelerating state, the lock-up clutch 17 is engaged, the motor-generator 3 functions as the electric generator using the kinetic energy of the wheel 6 so that the regenerative braking force is generated, the kinetic energy of the wheel 6 is transmitted to the alternator 8 via the engine 2, the electric power generated by the alternator 8 is stored in the battery 9, and the fuel cut control is performed (step S1).

Figure 3:
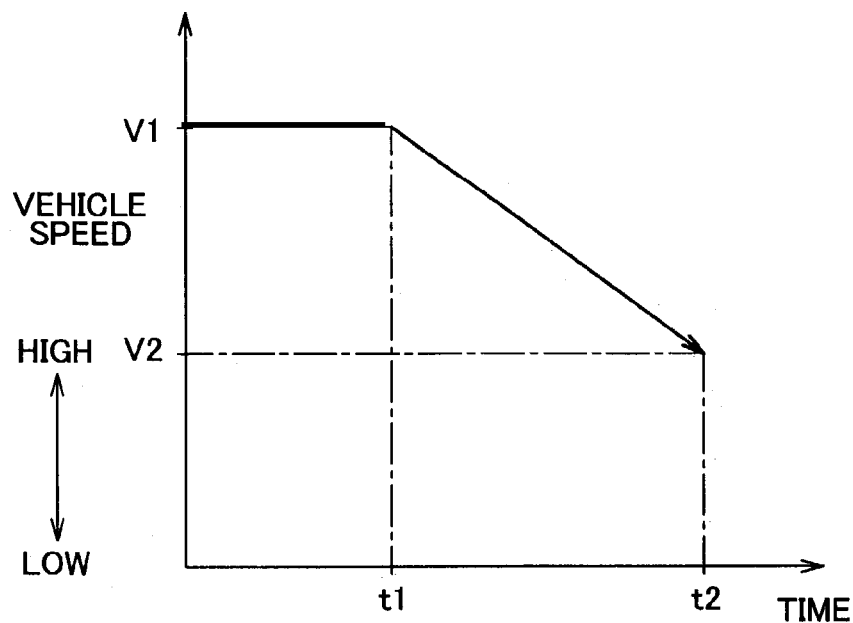
FIG. 3 is a map showing an example of a change in a vehicle speed determined in the first embodiment.

Following step S1, the braking request of the driver is determined (step S2). This braking request is determined based on whether or not the hydraulic pressure of the brake master cylinder 15, the stroke amount of the brake pedal 14, the amount of change in the vehicle speed, exceed given threshold values. An example of the amount of change in the vehicle speed is shown in a characteristic diagram of FIG. 3. As shown in FIG. 3, a vehicle speed V1 at time t1 changes to a vehicle speed V2 at time t2 after a predetermined time has elapsed. The vehicle speed V2 is lower than the vehicle speed V1.

Figure 4:
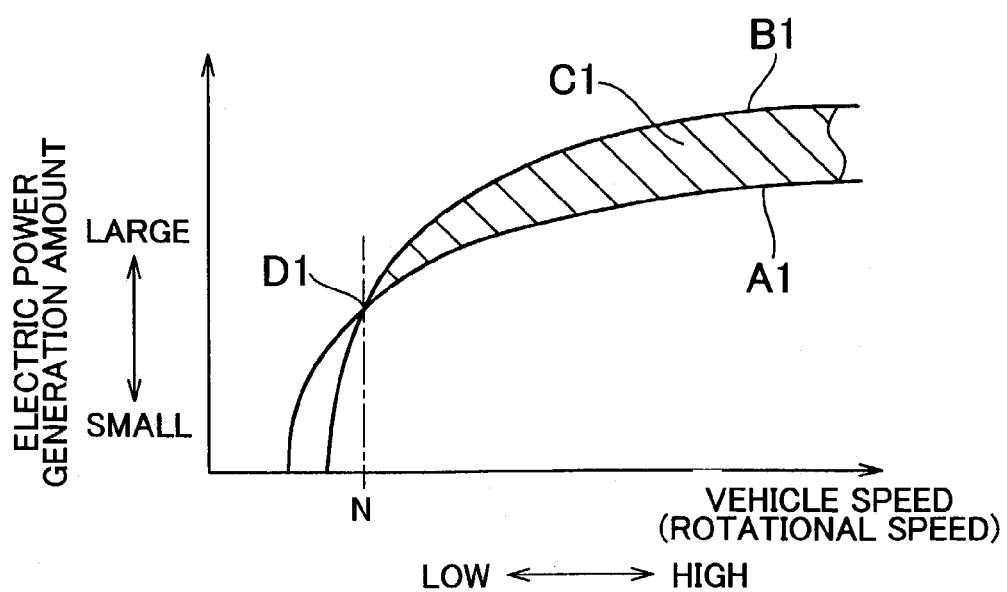
FIG. 4 is a characteristic diagram showing a relationship between the rotational speed and the electric power generation amount of the motor-generator, which is used in the first embodiment.

Following step S2, the regenerative braking force generated in association with the electric power generation by the alternator 8 is determined, and it is determined whether or not the braking force corresponding to the braking request of the driver is larger than the regenerative braking force (step S3). When an affirmative determination is made in step S3, the present vehicle speed and the actual voltage of the capacitor 11 are determined (step S4), and the operation rotational speed N is calculated (step S5). The operation rotational speed is a rotational speed of the motor-generator 3 corresponding to an intersection point D1 of the lines sharing both of electric power generator characteristics A1, B1, as shown in FIG. 4. Since the electric power generation amount of the motor-generator 3 changes due to the rotational speed, the DC/DC converter 12 is controlled using the operation rotational speed N as the reference in this embodiment. Hereinafter, an example of a method of calculating the operation rotational speed N will be described with reference to FIG. 4.

FIG. 4 is a characteristic diagram showing a relationship between the rotational speed of the motor-generator 3 and the electric power generation amount of the motor-generator 3. Since the rotational speed of the motor-generator 3 is indirectly determined based on the vehicle speed, the horizontal axis is labeled as "vehicle speed" instead of the rotational speed of the motor-generator 3 in FIG. 4. In a case where a resolver or the like for directly detecting the rotational speed of the motor-generator 3 is provided, a detection signal thereof may be used.

In FIG. 4, two kinds of electric power generation characteristics A1, B1 are shown by solid lines. The voltage of the capacitor 11 corresponding to the electric power generation characteristic A1 is lower than the voltage of the capacitor 11 corresponding to the electric power generation characteristic B1. These electric power generation characteristics A1, B1 are calculated as follows. The motor generator 3 has a characteristic that the electric power generation amount increases with an increase in the rotational speed. Meanwhile, the capacitor 11 has a characteristic that the electric power storing performance (the capacitance) changes due to the voltage thereof.

In this case, the electric power generation amount p of the motor-generator 3 corresponding to the electric power generation characteristic A1 can be calculated using, for example, the following equation:

$$p = f(n, V) \tag{1}$$

Meanwhile, the electric power generation amount p of the motor-generator 3 corresponding to the electric power generation characteristic B1 can be calculated using the following equation:

$$p = f(n, V + \Delta V) \tag{2}$$
$$\approx f(n * V/(V + \Delta V), V) * (V + \Delta V)/V$$

In each of the aforementioned equations, "f" is a function showing an output characteristic at the time of electric power generation, "V" is the voltage of the capacitor 11, and "n" is the rotational speed of the motor-generator 3. In the embodiment, the electric power generation amount p of the motor-generator 3 corresponding to the electric power generation characteristic A1 is calculated based on the rotational speed of the motor-generator 3 and the voltage of the capacitor 11. Meanwhile, the electric power generation amount p of the motor-generator 3 corresponding to the electric power generation characteristic B1 is calculated using the electric power generation characteristic A1 as the reference. More specifically, when the electric power generation amount p of the motor-generator 3 corresponding to the electric power generation characteristic B1 is calculated, the voltage of the capacitor 11 is doubled, and the rotational speed of the motor-generator 3 is doubled as compared with the electric power generation characteristic A1.

In other words, the term "(V+ΔV)/V" of the above equation (2) corresponds to the increase amount of the electric power generation amount in a case where the voltage of the capacitor 11 is doubled. In addition, the term "V/(V+ΔV)" of the equation (2) signifies that the rotational speed of the motor-generator 3 is doubled. With regard to both of the electric power generation characteristics A1, B1 thus calculated, there is a tendency for the electric power generation amount to increase with an increase in the rotational speed of the motor-generator 3. An intersection point D1 of the lines showing both of electric power generation characteristics A1, B1 signifies that the relation between the electric power generation amount p=f(n, V) corresponding to the electric power generation characteristic A1 and the electric power generation amount p=f(n, V+ΔV) corresponding to the electric power generation characteristic B1 at this point D1 is expressed by the following equation:

$$f(n, V)=f(n, V+\Delta V) \quad (3)$$

The rotational speed of the motor-generator 3 corresponding to the intersection point D1 is the operation rotational speed N.

When the rotational speed of the motor-generator 3 is lower than the operation rotational speed N, the electric power generation amount corresponding to the electric power characteristic A1 is larger than the electric power generation amount corresponding to the electric power generation characteristic B1. Meanwhile, when the rotational speed of the motor-generator 3 exceeds the operation rotational speed N, the electric power generation amount corresponding to the electric power generation characteristic B1 is larger than the electric power generation amount corresponding to the electric power generation characteristic A1. In FIG. 4, a region C1 shows the increased amount of the electric power amount when the voltage of the capacitor 11 corresponding to the electric power generation characteristic A1 is switched to the voltage corresponding to the electric power generation characteristic B1 by adding the voltage ΔV to the voltage corresponding to the electric power generation characteristic A1, in a case where the rotational speed of the motor-generator 3 exceeds the operation rotational speed N.

After the operation rotational speed N is calculated in step S5 as mentioned above, it is determined whether or not the present rotational speed of the motor-generator 3 exceeds the operation rotational speed N (step S6). When an affirmative determination is made in step S6, the voltage of the electric power to be supplied from the battery 9 to the capacitor 11 is increased by the DC/DC converter 12, and the electric power is supplied to the capacitor 11 (step S7). Then, the process returns to step S2. That is, when the electric power generated by the motor-generator 3 is stored in the capacitor 11, the electric power generation amount of the motor-generator 3 is controlled to be the electric power generation amount corresponding to the electric power generation characteristic B1.

Meanwhile, when a negative determination is made in step S6, the operation of the DC/DC converter 12 is turned off (step S8). Then, the process returns to step S2. That is, the electric power of the battery 9 is not supplied to the capacitor 11, and the electric power generation amount of the motor-generator 3 is controlled to be the electric power generation amount corresponding to the electric power generation characteristic A1. Also, when a negative determination is made in step S3, the process proceeds to step S8.

Thus, according to the embodiment, when the regenerative braking force is generated by the motor-generator 3 and the alternator 8 based on the braking request, and the electric power generated by the motor-generator 3 is stored in the capacitor 11, the operation of the DC/DC converter 12 is controlled so that the electric power generation amount of the motor-generator 3 becomes as large as possible. Therefore, the amount of electric power recovered by the capacitor 11 increases.

Also, in the embodiment, the electric power of the battery 9 is supplied to the capacitor 11 after increasing the voltage of the battery 9 using the DC/DC converter 12. Since the DC/DC converter 12 is an existing component which is provided to transmit electric power between the battery 9 and the capacitor 11, there is no need to newly provide another component for increasing the electric power generation amount of the motor-generator 3. Therefore, a reduction in the production efficiency of the vehicle 1, an increase in the manufacturing cost, and increases in the size and weight of the device can be suppressed.

Figure 5:
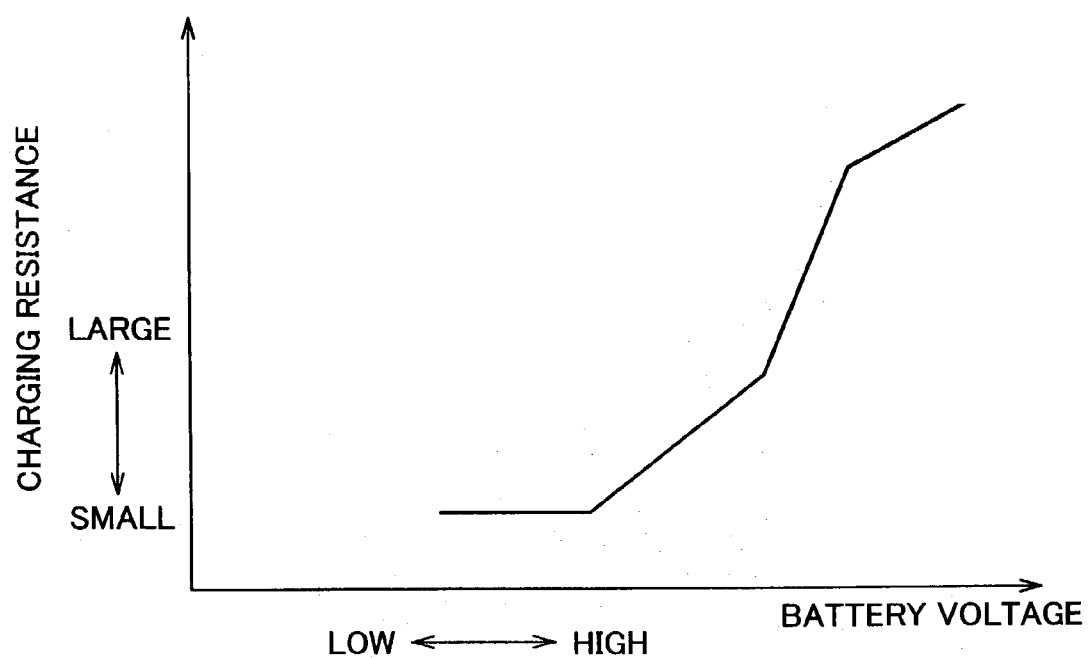
FIG. 5 is a characteristic diagram showing an example of the relationship between battery voltage and charging resistance in the first embodiment.

Also, when the electric power is supplied from the battery 9 to the capacitor 11, the voltage of the battery 9 decreases. This battery 9 is a secondary battery, and has a characteristic that the electric power storing performance is improved (the charging resistance decreases) with a decrease in the voltage as shown in FIG. 5. Therefore, when the electric power generated by the alternator 8 is stored in the battery 9, the recovery amount of electric power increases.

As mentioned above, in the embodiment, in the case of a high vehicle speed, such as in the case where the rotational speed of the motor-generator 3 is higher than the operation rotational speed N, the recovery amount of the electric power generated by the motor-generator 3 and the alternator 8 increases. This alters the difficulty of driving the motor-generator 3 or the alternator 8 as the electric generator using the engine output, and stores the generated electric power in the capacitor 11 or the battery 9 (more specifically, the location of storing the electric power, and the time for storing the electric power), and improves fuel efficiency.

Meanwhile, when the braking force is applied to the vehicle 1 based on the braking request of the driver, a portion of the required braking force which cannot be covered by the regenerative braking force generated by the motor-generator 3 and the alternator 8 is covered by the friction brake 18. In the embodiment, the braking force which is covered by the friction brake 18 can be made as small as possible. Therefore, the amount of the braking energy which is lost as friction heat can be suppressed. In FIG. 4 and the description thereof, a method of calculating, using the electric power generation characteristic A1 as a reference, the other electric power generation characteristic is exemplified. However, a map of the operation rotational speed at each voltage of the capacitor 11 may be made, and the map may be stored in the ECU 13.

Step S1 to step S6 correspond to the determination means according to the first aspect of the invention, and step S7 and step S8 correspond to the control means according to the first aspect of the invention. Also, the motor-generator 3 corresponds to the first electric generator according to the invention, the capacitor 11 corresponds to the first electric power storing device according to the invention, the alternator 8 corresponds to the second electric generator according to the invention, the battery 9 corresponds to the second electric power storing device according to the invention, and the DC/DC converter 12 corresponds to the intermediary device according to the invention. Also, in step S6, the actual rotational speed of the motor-generator 3 is compared with the operation rotational speed N, and it is determined whether or not the electric power generation amount of the first electric generator is equal to or larger than the predetermined amount.

FIG. 5 is a characteristic diagram showing an example of the relationship between the battery voltage and the charging resistance in the first embodiment. As shown in the figure, as battery voltage increases, charging resistance becomes greater.

Next, a second embodiment of the invention will be described.

Figure 6:
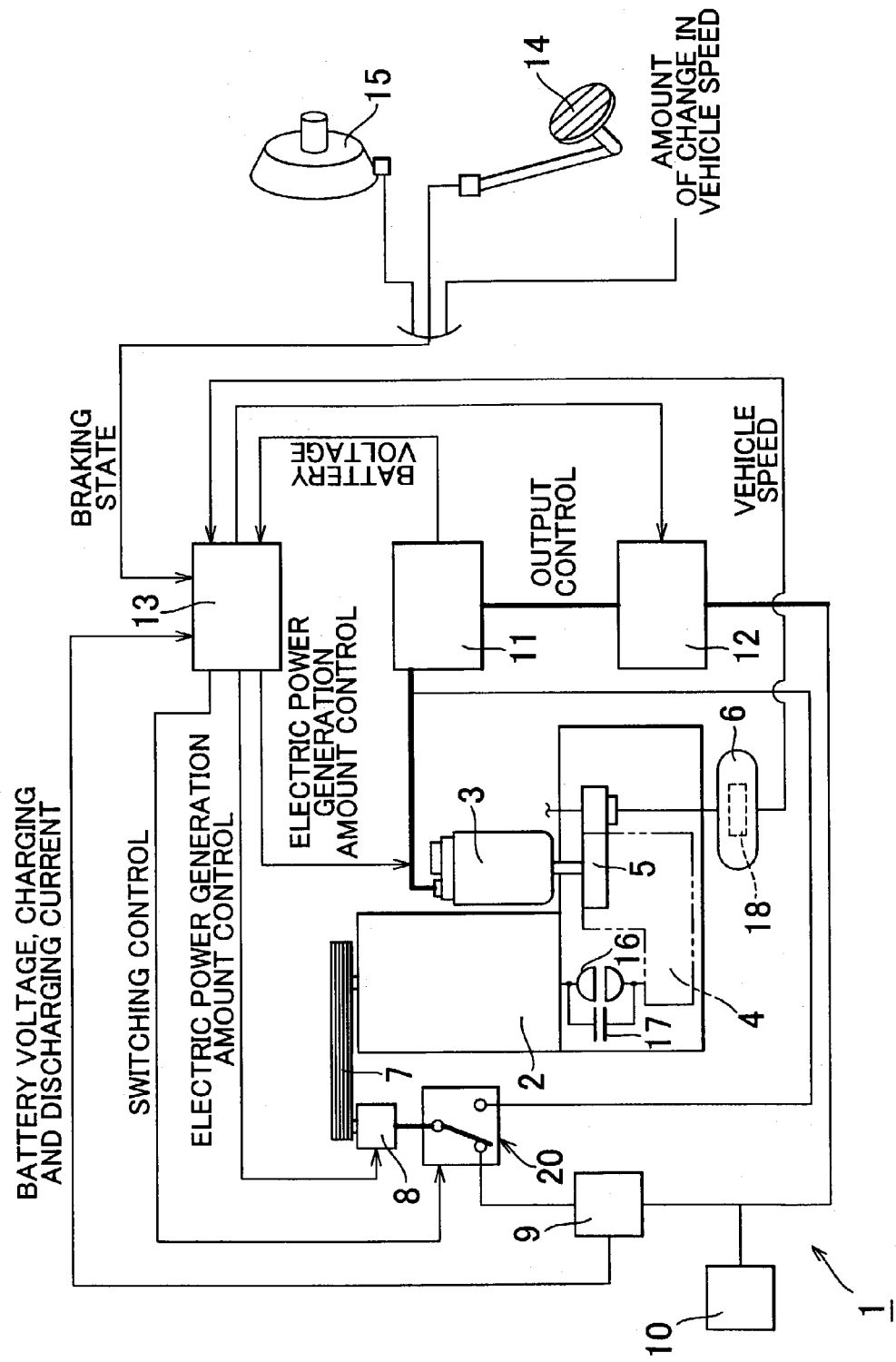
FIG. 6 is a conceptual diagram showing an example of a configuration of a vehicle to which a second embodiment can be applied.

FIG. 6 is a conceptual diagram which schematically shows the configuration of the vehicle 1. In FIG. 6, the same portions as in the configuration in FIG. 2 will be denoted by the same reference numerals, and the description thereof will be omitted. In FIG. 6, a power source switching portion (a selection switch) 20 is provided in the circuit between the alternator 8 and the battery 9. By switching the power source switching portion 20, the battery 9 or the capacitor 11 can be selectively charged with the electric power generated by the alternator 8. In the system in FIG. 6, controls other than the control in FIG. 1 and the action thereof are the same as in the system in FIG. 2.

Next, an example of control which can be performed in the system in FIG. 6 will be described with reference to a flowchart in FIG. 7. First, it is determined whether or not the vehicle 1 is in a state where the motor-generator 3 needs to function as the electric generator and the generated electric power needs to be stored in the capacitor 11 (step S11). In step S11, the determination is made based on whether or not physical amounts, such as the hydraulic pressure of the brake master cylinder 15, the stroke of the brake pedal 14, and the amount of change in the vehicle speed, exceed given threshold values.

For example, when there is no acceleration request, there is a braking request, and the vehicle 1 is coasting, an affirmative determination is made in step S11, and the process proceeds to step S12. In step S12, the kinetic energy of the wheel 6 is transmitted to the motor-generator 3, and the electric power generated by the motor-generator 3 is stored in the capacitor 11.

Following step S12, it is determined whether or not the required braking force exceeds the maximum value of the regenerative braking force generated by the function of the motor-generator 3 (step S13). The required braking force is determined based on the hydraulic pressure of the brake master cylinder 15, the stroke amount of the brake pedal 14. In other words, in step S13, it is determined whether or not there is a request for increasing the regenerative braking force using electric power generation by the alternator 8. An affirmative determination in step S13 signifies that the required electric power generation amount of the alternator 8 is equal to or larger than a predetermined amount. Then, when the affirmative determination is made in step S13, it is determined whether or not the lock-up clutch 17 is engaged (step S14). An affirmative determination in step S14 signifies that part of the kinetic energy of the wheel 6 is transmitted to the alternator 8 and the alternator 8 is performing electric power generation. Then, it is determined whether or not the electric power generation amount of the alternator 8 is the maximum value (step S15).

When a negative determination is made in step S15, the estimated value of the electric power generation amount in the case where the capacitor 11 is charged with the electric power generated by the alternator 8 is compared with the actual value of the electric power generation amount in the case where the battery 9 is being charged with the electric power generated by the alternator 8. Then, it is determined whether or not the estimated value of the electric power generation amount is larger than the actual value of the electric power generation amount (step S16).

The estimated value of the electric power generation amount in the case where the capacitor 11 is charged with electric power generated by the alternator 8 is determined using the following equation (4):

$$F(Vcap, Nalt, Ialtmax) \qquad (4)$$

Also, the actual value of the electric power generation amount in the case where the battery 9 is being charged with electric power by the alternator 8 is determined using the following equation (5):

$$F(Vbat, Nalt, Ialt) \qquad (5)$$

In each of the above equations (4) and (5), F(a, b, c) in Equation (4) is a function for the output characteristics of the motor-generator 3, and F(a, b, c) in Equation (5) is a function for the output characteristics of the alternator 8. Also, "Vcap" is the voltage of the capacitor 11, "Nalt" is the rotational speed of the alternator 8, "Ialtmax" is the maximum exciting current of the alternator 8, "Vbat" is the voltage of the battery 9, and "Ialt" is the present exciting current of the alternator 8.

Then, when an affirmative determination is made in step S16, this control routine terminates via the step S17. An affirmative determination in step S16 signifies that the amount of electric power which can be generated by the alternator 8 is equal to or larger than the present electric power generation amount (the predetermined amount). Therefore, in step S17, first, the electric power of the capacitor 11 is supplied to the battery 9 after the voltage of the capacitor 11 is decreased using the DC/DC converter. Next, the electric power generation by the alternator 8 is stopped, the power source switching portion 20 is switched so that the alternator 8 and the capacitor 11 are connected in the circuit. Then, the electric power generation by the alternator 8 is restarted, and the capacitor 11 is charged with the generated electric power. The electric power generation amounts of the alternator 8 and the motor-generator 3 are controlled so that the regenerative braking force generated by the alternator 8 and the motor-generator 3 becomes nearly the required braking force.

Meanwhile, when a negative determination is made in step S16, this control routine terminates via step S18. In step S18, the alternator 8 and the battery 9 continue to be connected in the circuit. Also, the following different controls are performed depending on the charge amount of the capacitor 11. When the charge amount of the capacitor 11 is equal to or larger than a predetermined value, the electric power of the capacitor 11 is supplied to the battery 9 after the voltage thereof is decreased by the DC/DC converter 12. At this time, the electric power generation by the alternator 8 is stopped. Meanwhile, when the charge amount of the capacitor 11 is less than the predetermined value, the electric power of the capacitor 11 is not supplied to the battery 9. Also, a control which fully charges the battery 9 with the electric power generated by the alternator 8 is performed.

When an affirmative determination is made in step S15, the process proceeds to step S18. Also, when a negative determination is made in step S14, the process proceeds to step S18 as well. However, since the lock-up clutch 17 is disengaged, the control concerning the electric power generation by the alternator 8 among the controls in step S18 cannot be performed. Further, when a negative determination is made in step S13, the process proceeds to step S18 as well. However, since the required braking force can be secured using the regenerative braking force of the motor-generator 3, only the control which supplies the electric power of the capacitor 11 to the battery 9 and stops the electric power generation by the alternator 8 among the controls in step S18 is performed. Further, when a negative determination is made in step S11, the process proceeds to step S18 as well.

Figure 7:
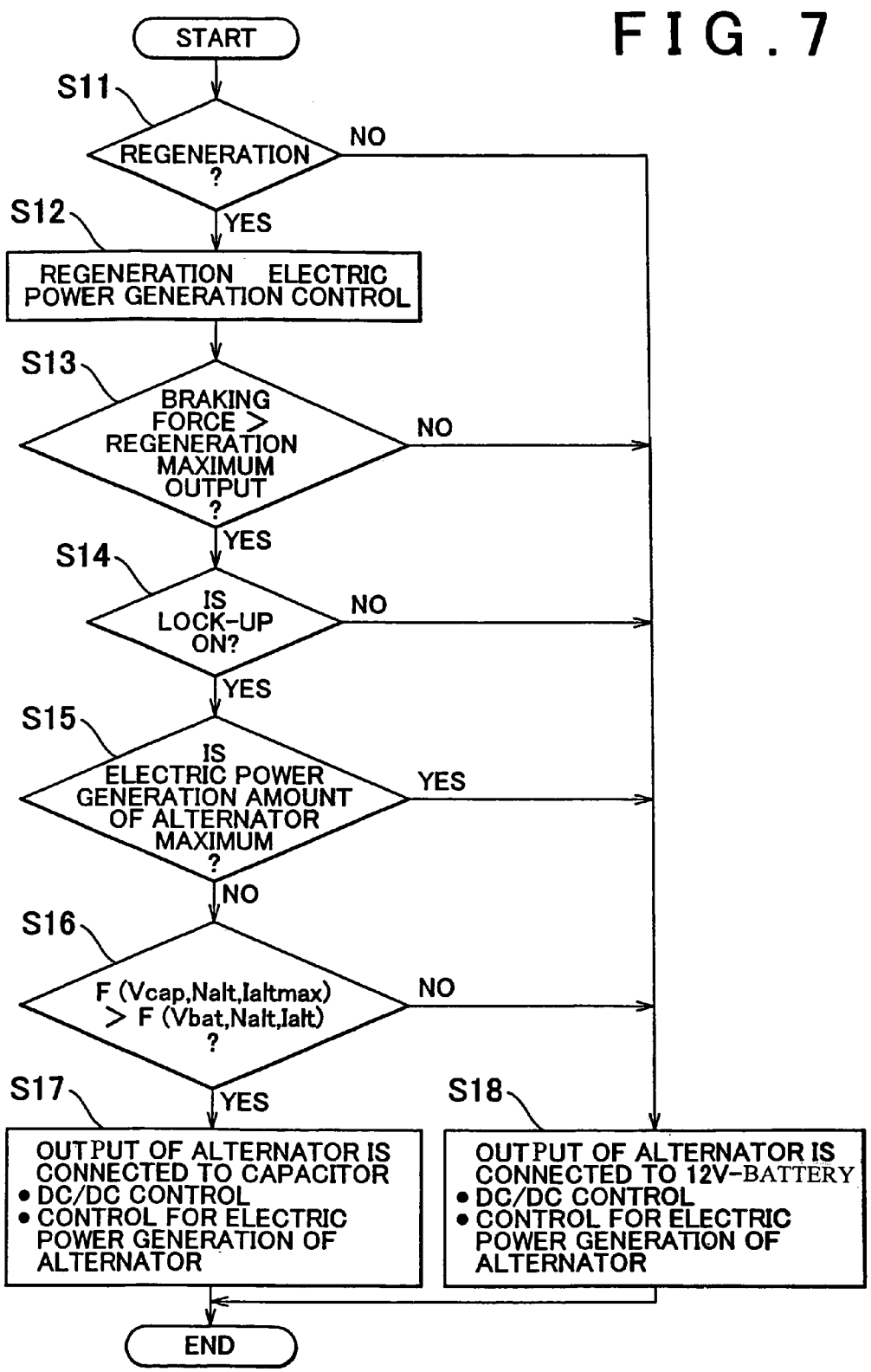
FIG. 7 is a flowchart showing a second embodiment of the invention.

Thus, in the embodiment shown in FIG. 7, when the required electric power generation amount of the alternator 8 is equal to or larger than the predetermined amount, the capacitor 11 is selected as a device for storing the electric power generated by the alternator 8. Since the voltage of the capacitor 11 is higher than that of the battery 9 and the capacitor 11 has a characteristic that the electric power acceptability is high, the actual electric power generation amount of the alternator 8 can be increased.

Therefore, the recovery amount of the electric power generated by the alternator 8 is increased.

Also, the capacitor 11 is a component which is previously provided so that electric power is transmitted between the capacitor 11 and the motor-generator 3. Therefore, there is no need to newly add another component for increasing the electric power generation amount of the alternator 8. Accordingly, a reduction in the production efficiency of the vehicle 1, an increase in the manufacturing cost, and increases in the size and weight of the device can be suppressed.

Further, as the power source switching portion 20, it is possible to employ a device which can switch between the power sources while the alternator 8 continues electric power generation, for example, a device using a semiconductor element. In this configuration, it is not necessary to stop the electric power generation by the alternator 8 in step S17. Therefore, a change in the braking force applied to the vehicle 1 is suppressed, and the driver is unlikely to feel discomfort.

Furthermore, in the embodiment shown in FIG. 7, the amount of electric power generated by the alternator 8 increases, and the generated electric power can be stored in the capacitor 11 and can be supplied from the capacitor 11 to the battery 9. This alters the difficulties of driving the motor-generator 3 or the alternator 8 as the electric generator using the engine output, and stores the generated electric power in the capacitor 11 or the battery 9 (more specifically, the location of storing the electric power, and the time for storing the electric power), and improves fuel efficiency. Further, the electric power generation amount of the alternator 8 is increased to the maximum value, and the generated electric power is supplied to the capacitor 11. Therefore, even the low (small) output of the motor-generator 3 which supplies electric power to the capacitor 11 is sufficient, and accordingly the size of the motor-generator 3 can be made small.

Step S13 and step S16 correspond to the determination means according to the first aspect of the invention, and step S17 and step S18 correspond to the control means according to the first aspect of the invention. The correspondence relation between the above description with reference to FIG. 6 and FIG. 7 and the configuration of the invention is as follows. The alternator 8 corresponds to the first electric generator according to the invention, the battery 9 corresponds to the first electric power storing device according to the invention, the motor-generator 3 corresponds to the second electric generator according to the invention, and the capacitor 11 corresponds to the second electric power storing device according to the invention.

The vehicle 1 shown in FIG. 2 and FIG. 6 has a power train configured such that both of the engine 2 and the motor-generator 3 can transmit power to the same wheel 6. However, the examples of controls in FIG. 1 and FIG. 7 can be applied to a vehicle (not shown) having a power train configured such that a wheel to which an engine is connected so that power can be transmitted and a wheel to which a motor-generator is connected are different. Also, in each of the embodiments, both the capacitor 11 and the battery 9, which are described as examples of the electric power storing devices, are secondary batteries. However, the invention can be applied to a case where one of the electric power storing devices is a primary battery.

According to the first embodiment of the invention, the electric power of the second electric power storing device is supplied to the first electric power storing device via the intermediary device, and thus the voltage of the first electric power storing device can be increased. Accordingly, the electric power generation amount of the first electric generator increases and the recovery amount of the electric power generated by the first electric generator increases. Also, since the intermediary device is a component which is previously provided so as to allow electric power to be transmitted between the first electric power storing device and the second electric power storing device, there is no need to provide another component in addition to existing components. Therefore, a reduction in the production efficiency of the vehicle 1, an increase in the manufacturing cost, and increases in the size and weight of the device can be suppressed.

Also, the voltage of the second electric power storing device decreases by supplying the electric power from the second electric power storing device to the first electric power storing device. Since the second electric power storing device has a characteristic that the electric power storing performance is improved (the charging resistance decreases) with a decrease in the voltage, the amount of electric power increases in a case where the electric power of the second electric generator is stored in the second electric power storing device.

Also, according to the second embodiment of the invention, it is determined whether or not the electric power generation amount of the first electric generator is equal to or larger than the predetermined amount, and based on the determination result, it is determined whether the electric power of the first electric generator is to be supplied to the second electric power storing device so as to increase the electric power generation amount of the first electric generator. Therefore, it is possible to increase the amount of the electric power that can be recovered by activating the first electric generator. Also, since the second electric power storing device is a component which is previously provided, there is no need to newly provide another component. Accordingly, a reduction in the production efficiency of the vehicle 1, an increase in the manufacturing cost, and increases in the size and weight of the device can be suppressed.

The controller (e.g., the electronic control units 13) of the illustrated exemplary embodiments may be implemented as one or more programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices that includes a finite state machine capable of implementing the procedures described herein can be used as the controller. A distributed processing architecture can be used for maximum data/signal processing capability and speed.

While the invention has been described with reference to preferred exemplary embodiments thereof, it is to be understood that the invention is not limited to the disclosed embodiments or constructions. On the contrary, the invention is intended to cover various modifications and equivalent arrangements. In addition, while the various elements of the invention are shown in various combinations and configurations, which are exemplary, other combinations and configurations, including more less or only a single element, are also within the spirit and scope of the invention.

"Determination means" that will be described in claims may be replaced by "an electric power generation amount determination unit" or "a controller for electric power generation amount determination", and "control means" may be replaced by "an electric power storing performance control unit" or "a controller for electric power storing performance control". In this case, the ECU 13 corresponds to the electric power generation amount determination unit, the electric power storing performance control unit, the controller for electric power generation amount determination, or the controller for electric power storing performance control. Also, "determination means" that will be described in claims may be replaced by "an electric power generation amount determination unit" or "a controller for electric power generation amount determination", and "control means" may be replaced by "an electric power generation state control unit" or "a controller for electric power generation state control". In this case, the ECU 13 corresponds to the electric power generation amount determination unit, the electric power generation state control unit, the controller for electric power generation amount determination, or the controller for electric power generation state control.

The invention claimed is:

1. A control system of a regeneration system, comprising:
a first electric generator;
a first electric power storing device to which electric power generated by the first electric generator is supplied;
a second electric power storing device which is provided separately from the first electric power storing device;
an intermediary device which is provided between the first electric power storing device and the second electric power storing device, and which allows electric power to be transmitted between the first electric power storing device and the second electric power storing device; and
a controller including:
determination means for determining whether an electric power generation amount of the first electric generator is equal to or larger than a predetermined amount; and
control means for determining whether electric power of the second electric power storing device is to be supplied to the first electric power storing device via the intermediary device, based on a determination result of the determination means;
wherein the second electric power storing device is a secondary battery, a second electric generator is provided separately from the first electric generator, and electric power generated by the second electric generator is supplied to the second electric power storing device.

2. The control system according to claim 1, wherein, when the determination means determines that the electric power generation amount of the first electric generator is equal to or larger than the predetermined amount, the control means permits the intermediary device to supply the electric power of the second electric power storing device to the first electric power storing device.

3. The control system according to claim 1, wherein the first electric power storing device is a capacitor, and the second electric power storing device is a battery.

4. The control system according to claim 1, wherein the first electric power storing device has a characteristic that electric power storing performance increases with an increase in voltage.

5. A control system of a regeneration system, comprising:
a first electric generator;
a second electric generator which is provided separately from the first electric generator;
a first electric power storing device which stores at least electric power generated by the first electric generator;
a second electric power storing device which is provided separately from the first electric power storing device, and which stores at least electric power generated by the second electric generator; and
a controller including:
determination means for determining whether an electric power generation amount of the first electric generator is equal to or larger than a predetermined amount; and
control means for determining whether the electric power of the first electric generator is to be supplied to the second electric power storing device so as to increase the electric power generation amount of the first electric generator, based on a determination result of the determination means.

6. The control system according to claim 5, wherein the control means supplies the electric power of the first electric generator to the second electric power storing device so as to increase the electric power generation amount of the first electric generator when the determination means determines that the electric power generation amount of the first electric generator is equal to or larger than the predetermined amount.

7. The control system according to claim 5, further comprising a switching means for switching between supply destinations of the electric power of the first electric generator by selecting one of the first electric power storing device and the second electric power storing device, and the second electric power storing device is selected as the supply destination of the electric power of the first electric generator when the determination means determines that the electric power generation amount of the first electric generator is equal to or larger than the predetermined amount.

8. The control system according to claim 5, wherein an accepting amount of electric power of the first electric power storing device is larger than that the second electric power storing device.

9. A control system of a regeneration system, comprising:
a first electric generator;
a first electric power storing device to which electric power generated by the first electric generator is supplied;
a second electric power storing device which is provided separately from the first electric power storing device;

an intermediary device which is provided between the first electric power storing device and the second electric power storing device, and which allows electric power to be transmitted between the first electric power storing device and the second electric power storing device; and a controller including:

a determination portion which determines whether an electric power generation amount of the first electric generator is equal to or larger than a predetermined amount; and a control device which determines whether or not electric power of the second electric power storing device is to be supplied to the first electric power storing device via the intermediary device, based on a determination result of the determination portion;

wherein the second electric power storing device is a secondary battery, a second electric generator is provided separately from the first electric generator, and electric power generated by the second electric generator is supplied to the second electric power storing device.

10. The control system according to claim 9, wherein, when the determination portion determines that the electric power generation amount of the first electric generator is equal to or larger than the predetermined amount, the control device permits the intermediary device to supply the electric power of the second electric power storing device to the first electric power storing device.

11. The control system according to claim 9, wherein the first electric power storing device is a capacitor, and the second electric power storing device is a battery.

12. The control system according to claim 9, wherein the first electric power storing device has a characteristic that electric power storing performance increases with an increase in voltage.

13. A control system of a regeneration system, comprising:

a first electric generator;

a first electric power storing device which stores at least electric power generated by the first electric generator;

a second electric power storing device which is provided separately from the first electric power storing device, and which stores at least electric power generated by the second electric generator; and a controller including:

a determination portion which determines whether an electric power generation amount of the first electric generator is equal to or larger than a predetermined amount; and a control device which determines whether or not an electric power generation amount of the first electric generator is to be supplied to the second electric power storing device so as to increase the electric power generation amount of the first electric generator, based on a determination result of the determination portion.

14. The control system according to claim 13, wherein the control device supplies the electric power of the first electric generator to the second electric power storing device so as to increase the electric power generation amount of the first electric generator when the determination portion determines that the electric power generation amount of the first electric generator is equal to or larger than the predetermined amount.

15. The control system according to claim 13, further comprising a switching device which switches between supply destinations of the electric power of the first electric generator by selecting one of the first electric power storing device and the second electric power storing device, and the second electric power storing device is selected as the supply destination of the electric power of the first electric generator when the determination portion determines that the electric power generation amount of the first electric generator is equal to or larger than the predetermined amount.

16. The control system according to claim 13, wherein an accepting amount of electric power of the first electric power storing device is larger than that of the second electric power storing device.

17. A control method of a regeneration system, in which electric power generated by a first electric generator is supplied to a first electric power storing device, and electric power is transmitted, via an intermediary device, between the first electric power storing device and a second electric power storing device which is provided separately from the first electric power storing device, comprising the steps of:

determining whether an electric power generation amount of the first electric generator is equal to or larger than a predetermined amount; and determining, based on a determination result, whether electric power of the second electric power storing device is to be supplied to the first electric power storing device via the intermediary device.

18. A control method of a regeneration system, in which electric power generated by a first electric generator is stored in a first electric power storing device, and electric power generated by a second electric generator is stored in a second electric power storing device, comprising the steps of:

determining whether an electric power generation amount of the first electric generator is equal to or larger than a predetermined amount; and supplying, based on a determination result, the electric power of the first electric generator to the second electric power storing device so as to increase the electric power generation amount of the first electric generator.

* * * * *